United States Patent [19]

Sandbrook et al.

[11] Patent Number: 4,552,651

[45] Date of Patent: Nov. 12, 1985

[54] CONTROL OF FROTH CELL PERFORMANCE THROUGH THE USE OF DIFFERENTIAL BUBBLER TUBES

[75] Inventors: Thomas D. Sandbrook, Eighty Four; Roy O. Scandrol, Library, both of Pa.

[73] Assignee: Conoco Inc., Wilmington, Del.

[21] Appl. No.: 575,964

[22] Filed: Feb. 1, 1984

Related U.S. Application Data

[63] Continuation-in-part of Ser. No. 551,222, Nov. 14, 1983, abandoned.

[51] Int. Cl.[4] .......... B01J 4/00

[52] U.S. Cl. .......... 209/1; 209/166

[58] Field of Search .......... 209/1, 166, 164, 168, 209/170; 73/438, 437, 302; 364/502

[56] References Cited

U.S. PATENT DOCUMENTS

| | | | |
|---|---|---|---|
| 2,577,548 | 12/1951 | Vetter | 73/439 |
| 2,715,463 | 8/1955 | Fitch | 209/159 |
| 2,886,051 | 5/1959 | Kroll et al. | 73/439 |
| 3,474,902 | 10/1969 | Putman | 209/1 |
| 3,499,580 | 3/1970 | Smith | 73/302 |
| 3,532,102 | 10/1970 | Glassey | 137/91 |
| 3,551,897 | 12/1970 | Cooper | 364/502 |
| 3,613,456 | 10/1971 | Hopfe et al. | 73/302 |
| 4,006,635 | 2/1977 | Khoi | 73/302 |
| 4,043,193 | 8/1977 | Bailey | 73/302 |
| 4,136,567 | 1/1979 | Rosenblum | 73/438 |
| 4,252,139 | 2/1981 | Davis et al. | 137/91 |
| 4,393,705 | 7/1983 | Eidschun | 73/439 |

FOREIGN PATENT DOCUMENTS

| | | | |
|---|---|---|---|
| 1101313 | 3/1961 | Fed. Rep. of Germany | 209/1 |
| 518232 | 8/1976 | U.S.S.R. | 209/1 |
| 652973 | 3/1979 | U.S.S.R. | 209/166 |

OTHER PUBLICATIONS

Carr et al., "State of the Art Assessment of Coal Preparation Plant Automation", ORNL -3699, U.S. Department of Energy (Feb. 1982), pp. 48–52.

C. H. Wells, Control Systems in Coal Preparation Plants, Report CS-1880 by Envirotech Corporation for Electric Power Research Institute (Jun. 1981), pp. 4–25 through 4–32.

*Primary Examiner*—Frank W. Lutter
*Assistant Examiner*—William Bond
*Attorney, Agent, or Firm*—William A. Mikesell, Jr.

[57] ABSTRACT

A method of controlling the separation of coal from a mixture of coal and refuse in a froth flotation device by measuring the differential back pressure between two gas bubbler tubes immersed to different depths into the body of pulp in the device to produce a first control signal representative of the pulp density, and adjusting the rate of addition of a froth enhancement additive to the froth flotation device responsive to changes in said first signal; a second signal, produced by measuring back pressure of a single bubbler tube and representative of the pulp level in said device, can be corrected for changes in density by combining it with said first signal and then utilized to control liquid level in the cell by adjusting the rate of withdrawal of refuse therefrom.

5 Claims, 2 Drawing Figures

CONTROL OF FROTH CELL PERFORMANCE THROUGH THE USE OF DIFFERENTIAL BUBBLER TUBES

CROSS-REFERENCE TO RELATED APPLICATION

This application is a continuation-in-part of U.S application Ser. No. 551,222, filed Nov. 14, 1983, now abandoned.

FIELD OF THE INVENTION

This invention relates to separation of ash and other refuse from raw coal by froth flotation. In one aspect, the invention relates to control of a coal froth flotation cell by adjusting the rate of addition of a froth enhancement additive responsive to a measurement of the density of the pulp in the cell. In another aspect, the invention relates to controlling a froth flotation cell by adjusting the rate of withdrawing refuse from the cell responsive to a measurement of the level of the pulp in the cell.

BACKGROUND ART

Glassey U.S. Pat. No. 3,532,102 discloses a blending control system which controls one of the two liquids being fed into a mixing chamber so that the blended product is controlled to any of a number of parameters such as density, consistency, pH.

Smith, U.S. Pat. No. 3,499,580 discloses a pressure pour apparatus and component. To obtain an indication of the pressure forcing the liquid up the discharge passageway, a bubbler tube is provided with its open exit end located below the surface of the liquid. So long as bubbles continue to emerge from the bubbler tube, the pressure in the tube is essentially an indicator of the pressure in the liquid at the submerged end of the tube and hence, by accounting for the difference in elevation between that submerged end and the submerged end of the discharge passageway, can be used as an indicator of the pressure in the liquid acting to force the liquid up the discharge passageway. Note col. 1 lines 54–64.

Kroll et al U.S. Pat. No. 2,886,051 discloses a control of density of a homogenous mixture of liquid and solid material such as ore in water. Kroll et al disclose that the majority of systems arranged to measure the density of this mixture in classifiers employ bubble-tubes as primary elements.

Vetter U.S. Pat. No. 2,577,548 discloses compensated specific gravity measuring.

Khoi U.S. Pat. No. 4,006,635 discloses a liquid level measuring process and indicator using two hydrostatic probes for spray, the first probe emerging near the bottom of the tank and the second slightly below the maximum filling level. A pressure differential/electric voltage transducer is connected to the probes.

Hopfe et al U.S. Pat. No. 3,613,456 discloses a bubbler method and apparatus comprising at least one pair of bubbler pipes wherein humidified gas is used as the bubbler fluid.

Cooper U.S. Pat. No. 3,551,897 discloses a method of controlling ore flotation using an analog or digital computer to optimize various measured parameters.

Davis et al U.S. Pat. No. 4,252,139 discloses a method and apparatus for automatically mixing a solution having a specified concentration. Davis et al are directed to the formation of Glauber salt.

Eidschun U.S. Pat. No. 4,393,705 discloses an apparatus which utilizes pipes of different lengths oriented vertically within the fluid of a reservoir which are constantly pressured with a gas source, normally air, for the measurement of the specific gravity of and calculation of the level of the liquid in the reservoir.

Carr et al, "State-of-the-Art Assessment of Coal Preparation Plant Automation", ORNL-3699, U.S. Department of Energy (February 1982) pp. 48–52 discloses adjustment of tailings flow to control liquid level, as measured by a single-leg dip tube, in a froth flotation beneficiation of coal.

C. H. Wells, "Control Systems in Coal Preparation Plants", Report CS-1880 by Envirotech Corporation for Electric Power Research Institute (June 1981) pp. 4–25 through 4–32 recognizes the desirability of reducing shortterm fluctuations in froth flotation of coal by utilizing feedback control from on-line measurements, and discusses manipulation of several process variables responsive to measurement of various parameters.

SUMMARY OF THE INVENTION

According to the invention, there is provided a method of controlling the separation of coal from a coal and refuse mixture in a froth flotation device which includes the steps of:

(a) measuring back-pressure differential between two bubbler legs immersed at different depths into the fluid (pulp) within the froth flotation device, and (b) adjusting the rate of addition of a froth enhancement additive to the pulp in response to changes in the pulp density as determined by the measuring.

In a preferred embodiment, a further measurement comprising back-pressure of one bubbler leg, representing apparent liquid level, is adjusted for pulp density by utilizing the measured differential pressure, and the resulting signal representing actual liquid level is utilized to adjust the rate of refuse discharge from the cell.

The benefits of the invention include the following:

That two primary variables which dictate froth cell performance, viz. liquid level and pulp density, are measured by a single device.

That through the use of this device it is possible to control reagent addition rates to the froth flotation cell based on processes occurring within the flotation cell. The prior art control systems are often expensive and complicated. They normally utilize nuclear density meters to measure the density of the material inputted to the flotation cell. The present invention measures the density of the material within the flotation cell using differential bubbler tubes without the need for nuclear density meters.

The preferred primary control of level of liquid in the froth cell is through the flow rate of the refuse from the froth flotation unit. Cell level is affected by pulp density, however the system of the invention compensates for the density effect and indicates the level of the three phase mixture (air, solids, and liquid).

By varying frother and collector flow rates, the pulp density and the percentage of coal recovery in the product may be varied.

It has been determined that the control system of the present invention contributes greatly to the stability of the froth flotation cell.

BRIEF DESCRIPTION OF THE DRAWING

The drawing is a schematic representation of a process in accordance with the present invention. In the embodiment shown in FIG. 1, a microprocessor is used to manipulate process data and to provide control signals, whereas in the embodiment illustrated in FIG. 2, individual electronic or pneumatic process indicating and controlling instrumentation is utilized.

DETAILED DESCRIPTION OF THE INVENTION

Figure 1:
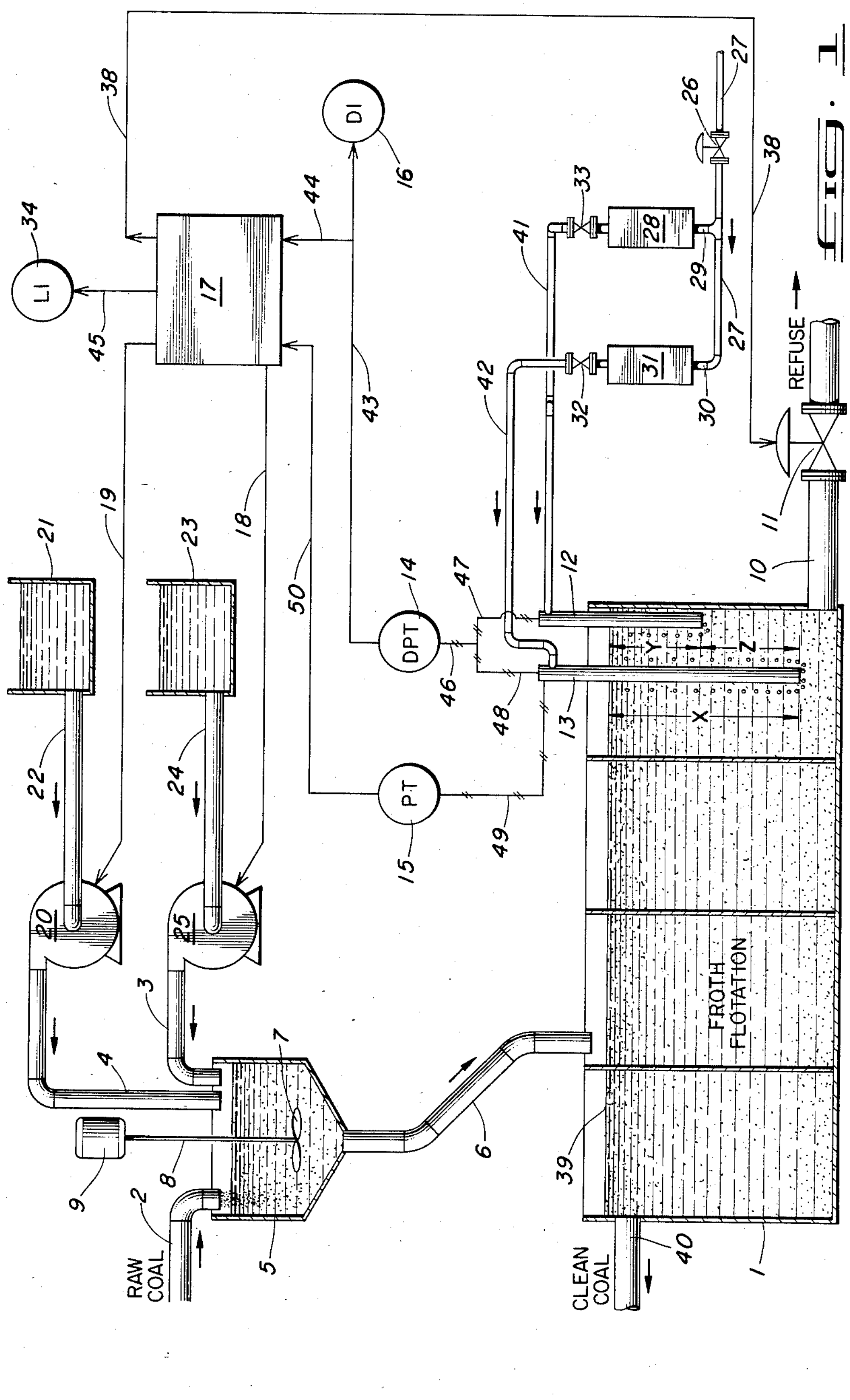

With more particular reference to FIG. 1 of the drawing, raw coal containing coal and refuse particles is fed through line 2 into mixing vessel 5. Frother in container 23 is fed through line 24 into pump 25. Pump 25 pumps frother through line 3 into mixing vessel 5. Collector in container 21 is fed through line 22 into pump 20. Pump 20 pumps collector through line 4 into mixing vessel 5. The raw coal mixture of coal and refuse particles fed through line 2 to mixing vessel 5 mixes with frother and collector in mixing vessel 5. The mixing is carried out by stirrer 7 on rod 8 rotated by motor 9. The mixture of raw coal frother and collector passes from mixing vessel 5 through line 6 to froth flotation unit 1. Clean coal leaves froth flotation unit 1 through line 40, and refuse is removed by way of line 10.

Air supply line 27 is provided with pressure control valve 26. Air from line 27 is fed into lines 29 and 30. Air from line 29 passes through rotometer 28 into line 41. Line 41 is connected to short bubbler tube 12. Air in line 30 passes through rotometer 31 into line 42. Line 42 is connected to long bubbler tube 13.

The mixture of liquids and solids in flotation tank 1 has an upper level 39. The distance between the upper level 39 of the liquid in the flotation tank 1 and the lower end of the short bubbler tube 12 is represented by the letter Y in the drawing. The distance between the lower end of long bubbler tube 13 and the liquid level 39 is represented by the letter X in the drawing. The difference in length between the lower end of the short bubbler tube 12 and the lower end of the long bubbler tube 13 is represented by the letter Z in the drawing.

The air flowing through the bubbler tubes creates a back pressure equal to the displaced hydrostatic head which is measured with the pressure transducers 14 and 15. The pressure transducers 14 and 15 send input signals to the microprocessor 17. The microprocessor 17 is programmed with a proportional and integral and a derivative algorithm. The microprocessor 17 controls the rate of addition of frother with a signal through line 18 to pump 25. The microprocessor 17 controls the addition of collector with a signal through line 19 through pump 20. The microprocessor 17 controls the flow rate of refuse through line 10 from froth flotation unit 1 by a signal through line 38 to valve 11.

The differential pressure transducer 14 sends a signal proportional to "Z" through line 43 to density recorder 16 and also through line 44 to microprocessor 17. Differential pressure transducer 14 receives its input from lines 46, 47, and 48. Line 47 is connected to short bubbler tube 12. Line 48 is connected to long bubbler tube 13.

The pressure transducer 15 is connected by line 49 to long bubbler tube 13. Pressure transducer 15 sends a signal proportional to "X" by line 50 to microprocessor 17.

Level recorder 34 is connected by line 45 to microprocessor 17. The level recorder 34 and the density recorder 16 can provide permanent record paper chart printouts of the liquid level and density respectively in the froth flotation unit 1.

The rotometer 31 is provided with valve 32 in line 42 to control the rate of flow of air therethrough. Similarly, rotometer 28 is provided with valve 33 in line 41 to control the rate of air flow therethrough. Valves 32 and 33 are preferably hand set valves which may be adjusted.

Figure 2:
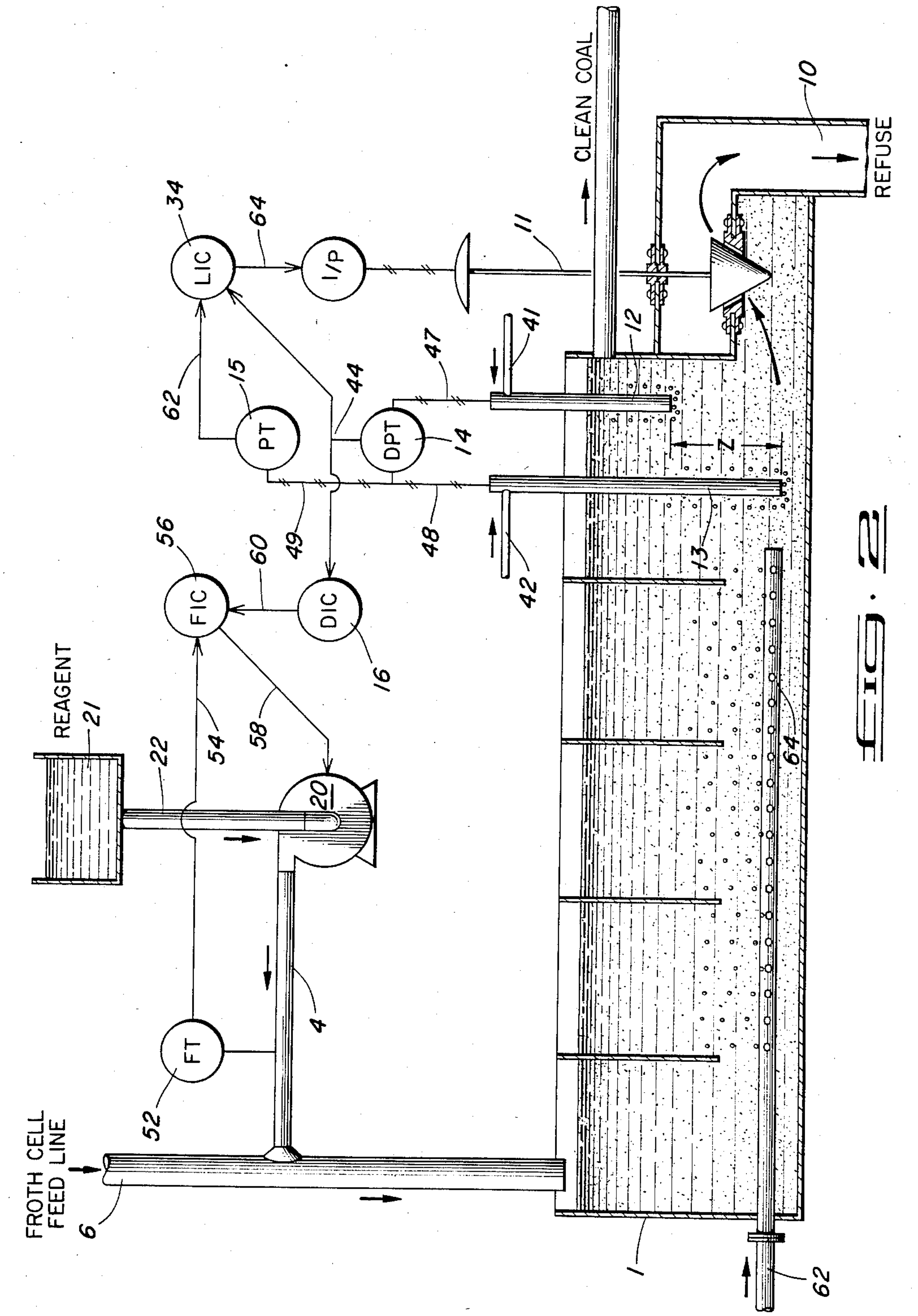

Reference is next made to FIG. 2 of the drawing, wherein like numerals have been used to indicate items similar to those of FIG. 1.

In FIG. 2, the flow of one or more reagents by way of line 4 into cell feed line 6 is maintained at a fixed value by a primary control loop comprising a flow transmitter 52 which measures flow in line 4 and sends a signal representative of the flow by way of signal line 54 to a flow controller 56. Controller 56 in turn transmits a control signal by way of line 58 to reagent feed pump 20. The fixed value of flow in line 4 is revised as the need arises by adjustment of the set point of controller 56 responsive to a signal from line 60 derived in a manner to be explained.

The fluid in froth cell 1 is actually three phase, i.e. a suspension of solids in liquid, which suspension is subjected to aeration to generate flotation bubbles, as by introduction of air from a pipe 62 into sparger 64. As discussed in conjunction with FIG. 1, a signal 44 representative of apparent fluid density is generated by bubbler tubes 12 and 13, and sensed by differential pressure transmitter 14. This signal 44 is utilized by controller 16 to generate the reset signal in line 60. We have discovered that the apparent fluid density is a measure of the separation effectiveness in the flotation cell, and thus is useful in adjusting the rate of addition of reagents such as frother and collector.

Also as discussed in conjunction with FIG. 1, the density signal in line 44 is advantageously combined by level controller 34 with a signal 62 from pressure transmitter 15 to provide a density-corrected depth signal in line 64, which signal is used to adjust valve 11 so as to maintain a constant liquid level in cell 1.

Having thus described the invention by reference to certain of its preferred embodiments it is pointed out that embodiments described are illustrative rather than limiting in nature and that many variations and modifications are possible within the scope of the present invention. Such variations and modifications may appear obvious and desirable to those skilled in the art upon a review of the foregoing description of preferred embodiments.

What is claimed is:

1. A method of controlling the separation of coal from a coal and refuse pulp mixture in a froth flotation means comprising the steps of:

(a) providing a froth flotation means, and a differential bubbler tube means, said bubbler tube means comprising two tubes disposed to different levels into the pulp within said flotation means, (b) passing gas through said differential bubbler tube means while measuring the differential back pressure of said tubes and also the back pressure of one of said tubes, (c) producing a first control signal proportional to the ratio of said back pressure to said differential back pressure, and a second control signal proportional to said differential back pressure, (d) feeding a mixture of coal and refuse pulp to said froth flotation means to form a coal froth product and a refuse output, (e) controlling the flow rate of said refuse output from said froth flotation means in response to changes in said first control signal, and (f) controlling the rate of addition of a froth enhancement additive to said froth flotation means in response to changes in said second control signal.

2. The method of claim 1 wherein said froth enhancement additive comprises collector and frother.

3. The method of claim 1 wherein said froth enhancement additive comprises frother.

4. A method of controlling a froth flotation operation to effect the separation of coal from a pulp comprising a mixture of coal and refuse which comprises:

(a) passing said mixture into a flotation zone, (b) providing two bubbler tube means disposed to different elevations in the pulp including the mixture within said flotation zone, (c) passing a gas through each of said two bubbler tube means and measuring the differential back pressure therebetween to provide a first control signal, (d) passing a froth enhancement additive by way of a flow control device into said flotation zone, and (e) adjusting said flow control device responsive to changes in said first control signal.

5. The method of claim 4 further comprising measuring the back pressure of a gas passing through a bubbler tube means into the pulp in said flotation zone to provide a second signal, generating a third signal proportional to the ratio of said second signal to said first signal, and controlling the rate of withdrawal of a refuse fraction from said flotation zone responsive to said third signal.

* * * * *